United States Patent
Yeakel (10) Patent No.: US 7,182,362 B2
(45) Date of Patent: Feb. 27, 2007

(54) REMOTE LOCKING FIFTH WHEEL

(75) Inventor: Willard Supplee Yeakel, Greensboro, NC (US)

(73) Assignee: Volvo Trucks North America Inc., Greensboro, NC (US)

( * ) Notice: Subject to any disclaimer, the term of this patent is extended or adjusted under 35 U.S.C. 154(b) by 74 days.

(21) Appl. No.: 10/478,114

(22) PCT Filed: Nov. 19, 2002

(86) PCT No.: PCT/US02/37091

§ 371 (c)(1), (2), (4) Date: Nov. 18, 2003

(87) PCT Pub. No.: WO03/043838

PCT Pub. Date: May 30, 2003

(65) Prior Publication Data

US 2004/0145150 A1   Jul. 29, 2004

Related U.S. Application Data

(60) Provisional application No. 60/331,752, filed on Nov. 20, 2001, provisional application No. 60/332,660, filed on Nov. 19, 2001.

(51) Int. Cl.
*B62D 53/06* (2006.01)
(52) U.S. Cl. .................. 280/433; 340/431
(58) Field of Classification Search ........ 280/432–434, 280/437, 477, DIG. 14; 340/426, 428, 431, 340/438, 686.2, 686.6; 701/30
See application file for complete search history.

(56) References Cited

U.S. PATENT DOCUMENTS

| | | | |
|---|---|---|---|
| 3,628,811 A | 12/1971 | Rivers | |
| 4,838,570 A * | 6/1989 | Toikka et al. | 280/507 |
| 5,028,067 A * | 7/1991 | Madura | 280/433 |
| 5,069,472 A | 12/1991 | Parr et al. | |
| 5,346,239 A * | 9/1994 | Wohlhuter | 280/420 |
| 5,861,802 A * | 1/1999 | Hungerink et al. | 340/431 |
| 5,917,405 A | 6/1999 | Joao | |
| 5,988,665 A | 11/1999 | Terry et al. | |
| 6,272,949 B1 * | 8/2001 | Jarvis et al. | 74/569 |
| 6,285,278 B1 * | 9/2001 | Schutt et al. | 340/431 |
| 6,313,791 B1 * | 11/2001 | Klanke | 342/357.17 |
| 6,394,480 B1 * | 5/2002 | Brennan | 280/432 |
| 6,402,176 B1 * | 6/2002 | Timmings | 280/433 |
| 6,439,594 B1 * | 8/2002 | Johansson | 280/425.1 |
| 6,588,790 B2 * | 7/2003 | Hall | 280/513 |
| 6,634,666 B2 * | 10/2003 | Shilitz et al. | 280/470 |
| 6,697,735 B2 * | 2/2004 | Doyle | 701/213 |
| 6,700,533 B1 * | 3/2004 | Werb et al. | 342/357.07 |
| 6,774,762 B2 * | 8/2004 | Bates | 340/5.21 |

* cited by examiner

*Primary Examiner*—Lesley D. Morris
*Assistant Examiner*—L. Lum
(74) *Attorney, Agent, or Firm*—Martin Farrell (57) ABSTRACT

A remote controlled locking system for locking a trailer to a truck by locking a mechanism that secures the truck to the trailer. The system may include a remotely located transmitter adapted to transmit a control signal. A receiving unit on the truck is adapted to receive the control signal. An actuator is coupled to the receiving unit and to the mechanism for selectively inhibiting movement of the mechanism depending on information relayed by the control signal.

23 Claims, 8 Drawing Sheets

REMOTE LOCKING FIFTH WHEEL

RELATED APPLICATIONS

The present application claims priority from provisional U.S. patent application Ser. No. 60/331,752, filed on Nov. 20, 2001, provisional U.S. patent application Ser. No. 60/332,660, filed on Nov. 19, 2001, and U.S. patent application Ser. No. 10/092,318, filed on Mar. 6, 2002. U.S. patent applications having Ser. Nos. 60/331,752; 60/332,660; and 10/092,318 are incorporated herein by reference in their entirety.

TECHNICAL FIELD

The present invention relates generally to coupling of trailers to trucks and/or tractors and, more particularly, the present invention relates to a remote controlled locking system for selectively locking a coupling or locking mechanism of a truck and/or tractor and a trailer.

BACKGROUND ART

Tractor trailers are used to transport a wide variety of loads. Some tractor trailers haul hazardous materials. A hazardous material load could pose a security risk, especially if the load can be moved to a vulnerable location. Transportation security depends on keeping trailer loads, especially hazardous material loads under control at all times.

Trailers are typically coupled to tractors by a king pin of the trailer secured in a fifth wheel of the tractor. The fifth wheel includes a locking mechanism with jaws that engage the king pin to secure the trailer to the tractor. The mechanism allows the jaws to disengaged. When the jaws are disengaged the king pin can be inserted into or removed from the jaws, allowing the trailer to be coupled or uncoupled from the tractor. The mechanism also facilitates engagement to the jaws around the king pin, securing the trailer to the tractor. One such fifth wheel mechanism is disclosed in U.S. Pat. No. 5,988,665 to Terry et al., which is incorporated herein by reference in its entirely.

Many modem tractors include electronically controlled engines. GPS receivers and sophisticated communications systems are available for tractors. Modem tractors may include an on-vehicle computer system that could be used to control the engine.

A trailer is generally much less sophisticated than the associated tractor. Existing trailers do not typically include GPS receivers, communications systems, onboard computer systems or other systems that would allow the trailer to be adapted to be remotely controlled in the event the trailer was seized and separated from the tractor.

As a result, there is a need for system that locks a trailer to an associated tractor in response to a state of a remote signal. One such system prevents locking jaws of a fifth wheel of a truck around a king pin of a trailer from being released unless an appropriate remote signal is received by the system.

DISCLOSURE OF THE INVENTION

The present invention relates to a remote controlled locking system for locking a locking mechanism that secures a trailer to a truck. The system may include a remotely located transmitter adapted to transmit a control signal. A receiving unit on the truck is adapted to receive the control signal. An actuator coupled to the receiving unit and to the locking mechanism selectively inhibits movement of the locking mechanism depending on information relayed by the control signal.

In one embodiment of the remote control locking system, the locking mechanism locks a kingpin of a trailer in jaws of a fifth wheel of a truck. The receiving unit monitors a state of the control signal. The actuator is coupled to the fifth wheel jaws and is controlled by the receiving unit. The receiving unit sends a lock signal or an unlock signal to the actuator depending on the state of the control signal transmitted by the transmitter. The actuator prevents the fifth wheel jaws from being disengaged from the kingpin when the receiving unit provides a lock signal. The actuator allows the fifth wheel jaws to be disengaged from the kingpin when the receiving unit provides the unlock signal.

In one embodiment the actuator is a solenoid with an extendable lock pin. The lock pin extends to prevent the fifth wheel jaws from being disengaged from the kingpin when the receiving unit provides a lock signal to the solenoid. The lock pin may directly engage one of the components of the fifth wheel jaws to prevent the fifth wheel jaws from being disengaged from the kingpin. The lock pin may also engage a hand lever or a component attached to the hand lever to prevent the hand lever from being pulled to prevent the fifth wheel jaws from being disengaged from the kingpin when the receiving unit provides the lock signal to the solenoid.

In one embodiment, the fifth wheel includes a linear actuator that assists engagement and disengagement of the fifth wheel jaws. In this embodiment, the actuator is an air solenoid. The air solenoid may prevents the linear actuator from disengaging a fifth wheel lever, thereby preventing the fifth wheel jaws from disengaging from the kingpin when the receiving unit provides the lock signal to the solenoid.

The control signal can be conveyed to the receiving unit in a variety of ways. For example, the signal may be transmitted by a low earth orbit satellite system, a high earth orbit satellite system, short range digital communications (SRDC) or mobile telephones.

In one embodiment, the system includes a global positioning system on the tractor. The receiving unit provides the lock signal when the global positioning system indicates that the truck is in an unacceptable area. In one embodiment, the receiving unit provides the lock signal when the receiving unit is outside a predefined range of the transmitter. In this embodiment, the receiving unit provides the unlock signal when the receiving unit is inside the predefined range. In one embodiment, the predefined range is defined by the range of a short range digital communication system.

The system may be used to prevent a trailer from being uncoupled from the tractor in an unauthorized or unplanned area. In a method for preventing a trailer from being uncoupled from a tractor in an unauthorized area, a planned trailer uncoupling area is defined. The location of the tractor is monitored. Jaws of the fifth wheel of the tractor are locked around the kingpin of the trailer when the trailer is outside the planned uncoupling area.

Additional features of the invention will become apparent and a fuller understanding obtained by reading the following detailed description in connection with the accompanying drawings.

BEST MODE FOR CARRYING OUT THE INVENTION

The following disclosure concerns a remote controlled locking system 10 that selectively locks a locking mechanism 32 that secures a trailer 20 to a tractor 16. In the illustrated embodiments, the tractor and trailer are secured by jaws 12 of a fifth wheel 14 of a tractor 16 around a king pin 18 of a trailer 20. Referring to FIGS. 2, 3, 6, 9 and 10, the system 10 includes a remotely located transmitter 24 that transmits the control signal 22. A receiving unit 26 is mounted on the tractor 16. The receiving unit 26 monitors a state of the control signal. An actuator 28 is coupled to the fifth wheel jaws 12. The actuator 28 is controlled by the receiving unit. The actuator 28 prevents the fifth wheel jaws 12 from being disengaged from the king pin 18 when the receiving unit provides a lock signal to the actuator in response to the state of the control signal. The actuator 28 allows the fifth wheel jaws 12 to be disengaged from the king pin 18 when the receiving unit provides an unlock signal to the actuator 28 in response to the state of the control signal 22.

FIGS. 2, 3, 6, and 9 illustrate one type of fifth wheel ramp. It should be readily apparent to those skilled in the art that the disclosed system could also be used on a variety of other types of fifth wheels. The illustrated fifth wheel 14 includes a base member 30 and a mechanism 32 that engages and disengages the jaws 12. The base member includes a top plate 34 and a peripheral flange 36, which are generally formed to define a receiving throat 38 in which a kingpin 18 depending from a trailer fits. The base member 30 further includes the gussets and flanges necessary to give strength and support to the top plate and peripheral flange and includes mounting means for mounting the fifth wheel to the tractor. The mechanism 32 is mounted to the base member 30.

As may be seen in FIGS. 2, 3, 6, and 9, an operating handle 40 has a first end 42 pivotally mounted to the base member 30 proximal throat 38 at pivot axis 44 by a conventional bolt, spacers, and fasteners. In the illustrated embodiment, the operating handle 40 is an elongated member that extends past the throat 38. The operating handle is operatively connected to a bumper sub assembly 48 for concomitant motion therewith relative to pivot axis 44. The bumper sub-assembly 48 is pivotally mounted to the operating handle 40 and is supported conventionally in the base member. A coil spring 50 biases the bumper assembly toward a closed position relative to the throat 38. The operating handle 40 is also connected to a wedge member 52 by a pin 54, which may be formed on the wedge member 52 or inserted therein. The pin 54 is received in a slot 56 formed in the operating handle at an angle offset from the longitudinal axis of the operating handle to allow the wedge 52 to move in a straight line as the operating handle 40 pivots in an arc about axis 44. A timing lever 58 has a first end 60 mounted to the pin 54 such that the timing lever 58 may pivot about the pin 54 as the wedge 52 moves linearly. The timing lever 58 has a second end which has a camming surface 62 formed thereon and a follower pin 64 extending therefrom. In the illustrated embodiment, the operating handle 40, wedge 52, and timing lever 58 are all generally plate like members and are in stacked relation to one another at their common connection at pin 54. The follower pin 64 extends from the timing lever 58 in the direction of the operating handle 40 and is designed for cooperative engagement with an edge of the operating handle during operation of the mechanism 32.

Extending from the opposite side of the timing lever 58 is a spring bracket 66 which is connected to one end of an extension spring 67. Spring 67 is secured at its other end to the base member 30 at a bracket 15, such that the timing lever 58 is biased for pivotal rotation about pin 54 toward throat 38. A camming pin 68 (FIGS. 3 and 6) is mounted to the base member 30 intermediate bracket 15 and the camming surface 62 on timing lever 58. The timing lever 58 also has formed therein an elongated slot 69 which is spaced from and extends radially from the pin 54. Slot 69 receives therein a pivot pin 71 which extends from a jaw member 46. Jaw member 46 is cooperatively positioned with wedge member 52 in accordance with the known operation of fifth wheels such that when a king pin is received in the throat 38, wedge member 52 abuts and urges the jaw member into locked engagement therewith to lock the kingpin against fixed jaw 47. Jaw member 46 is connected to the operating handle 40 only through pin 71, timing lever 58, and pin 54. Extension spring 67 biases the timing lever toward the throat such that the lever 58 is urged against pin 71. The operating handle 40 has a second end 55 which carries a locking and indicator assembly 51. The assembly 51 is pivotally connected to end 55 by a pin 82 for pivotal motion in a plane substantially parallel to the plane of motion of operating handle 40. The second end 55 has a transverse arcuate slot 53 formed therein. The slot receives a stabilizing pin 84 extending from the indicator assembly 51. The assembly 51 is essentially a plate having a pawl 86 extending from and forming one margin thereof and a dog 87 extending from and forming an opposite margin with pin 84 intermediate the margins. In the embodiment illustrated by FIG. 9, the dog 87 is connected by a pin and clevis or other suitable connection to an end of a rod 89 of a linear actuator 61 mounted to the base member 30. In this embodiment, the linear actuator is connected to a remote source of fluid pressure for selective activation. In alternate embodiments (FIGS. 2,3 and 6), the actuator 61' may be replaced with an extension spring or may have an internal return spring 61 such that retraction of rod 89 urges assembly 51 about in 84 toward dog 87.

The pawl 86 is pivotally connected to a pull handle 92 which extends beyond the base member 30 as is commonly known. In the illustrated embodiment, the pawl 86 and handle 92 are biased inwardly by the actuator or spring such that the pawl 86 is seated behind a stop 63 formed on the base member 30. Accordingly, rotation of operating handle 40 about the pivot axis 44 will result in pawl 86 abutting against stop 63. In the illustrated fifth wheel, the operating handle 40 can only be moved to the open position shown in FIG. 2 after assembly 51 has been pivoted by the actuator 61 or handle 92 to move the pawl 86 such that it will not engage the stop 63.

Figure 1:
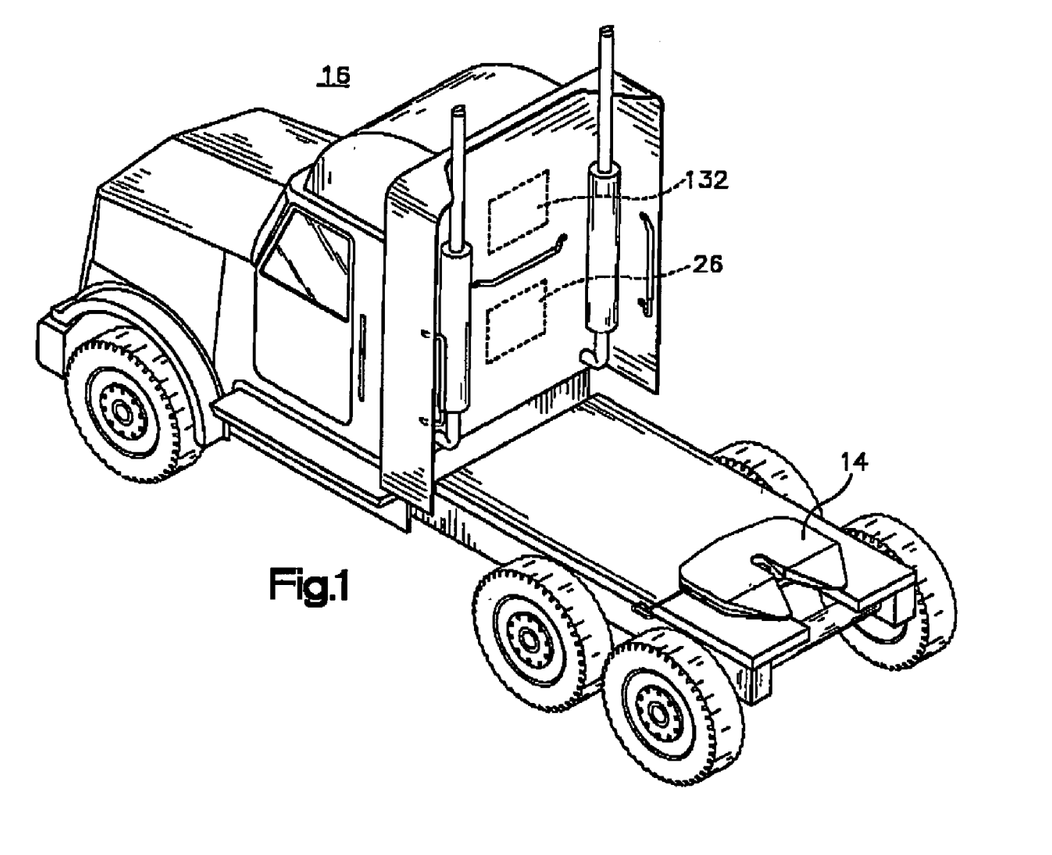
FIG. 1 is a perspective view of an over the highway tractor having a fifth wheel.
Figure 2:
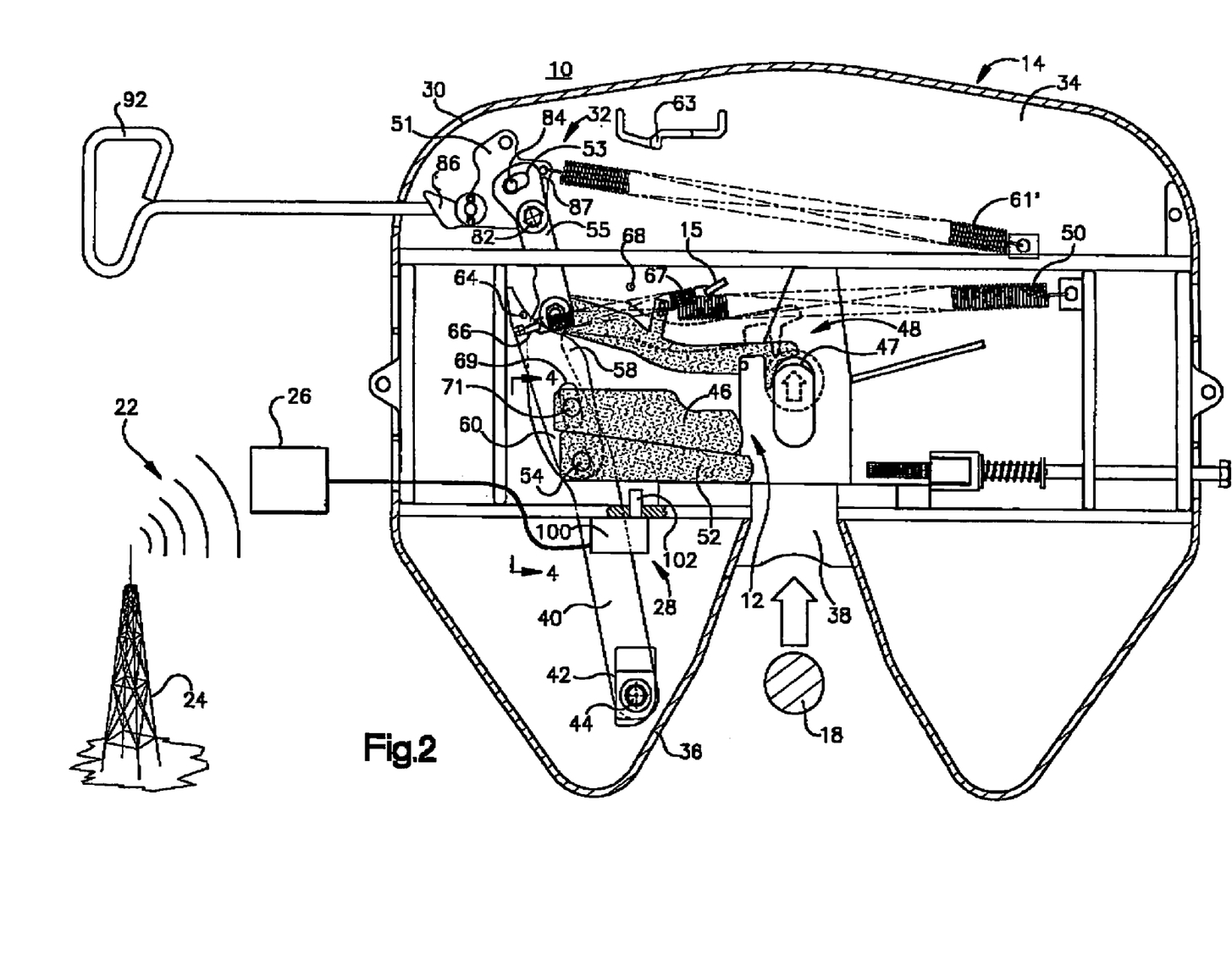
FIG. 2 is a schematic representation of a remote controlled fifth wheel locking system.
Figure 6:
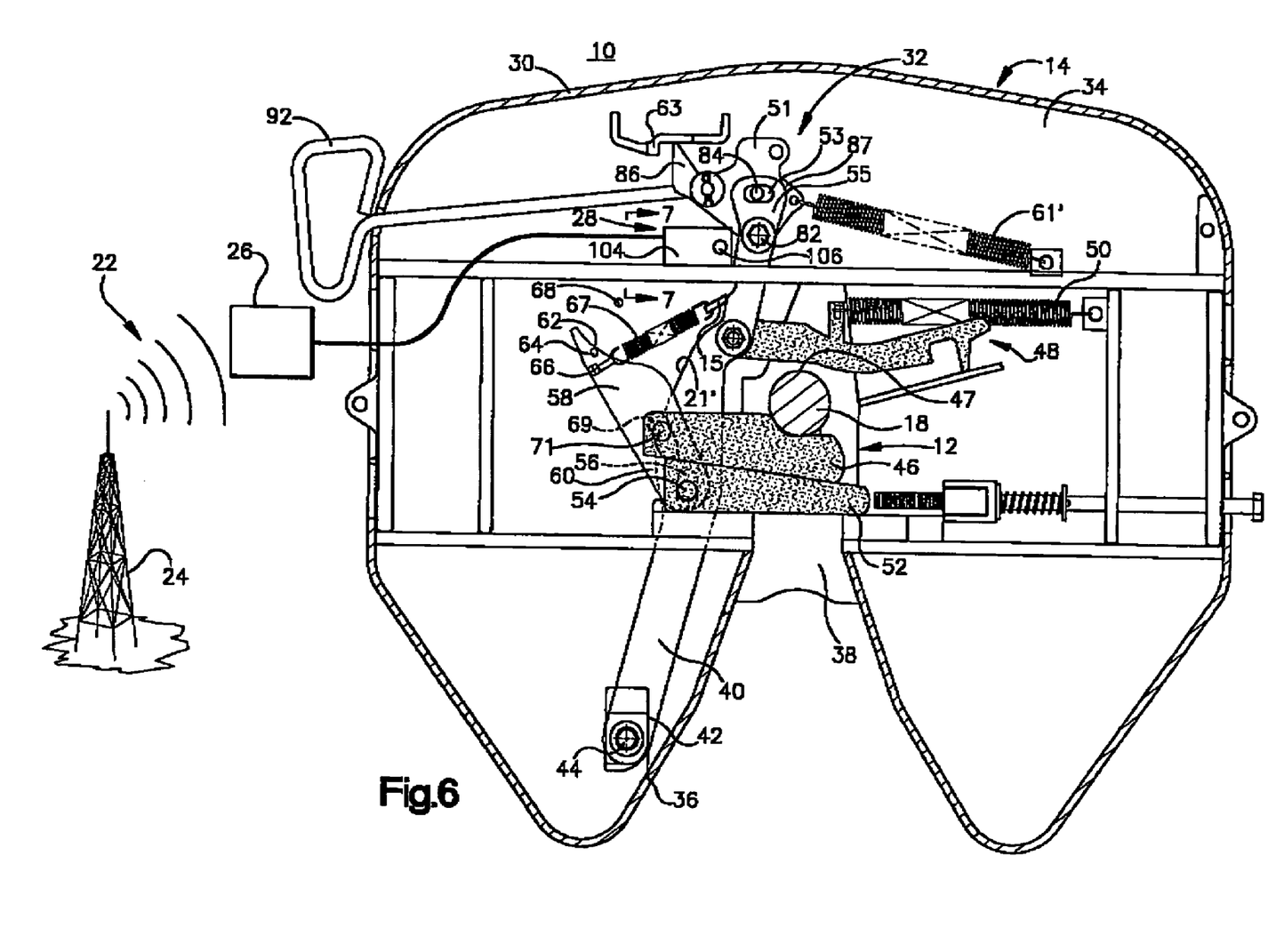
FIG. 6 is a schematic representation of a remote controlled fifth wheel locking system.
Figure 9:
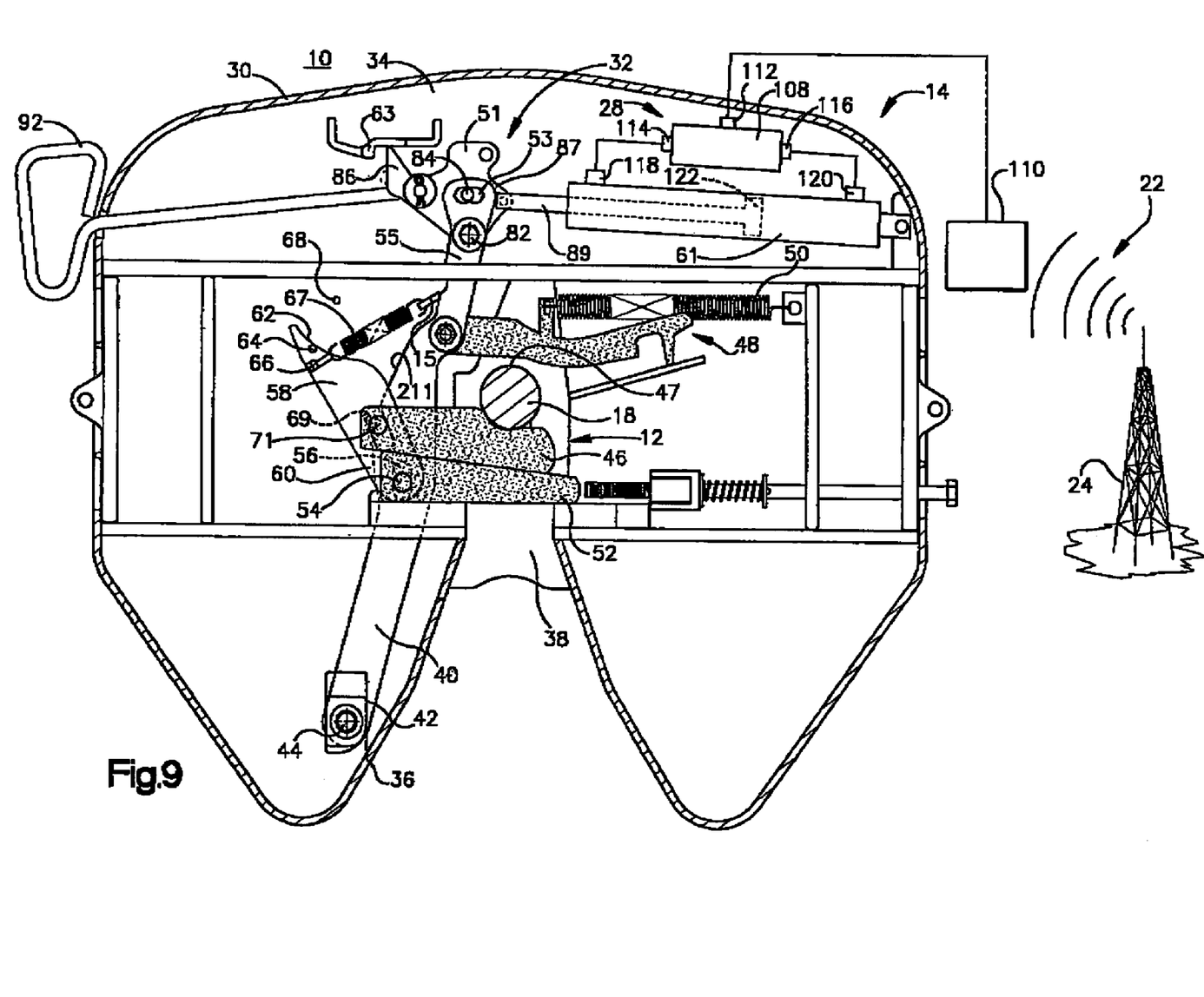
FIG. 9 is a schematic representation of a remote controlled fifth wheel locking system.

FIGS. 2, 6 and 9 shows the wedge 52 and jaw 46 of the mechanism 32 in the closed locked position and the operating handle 40 in the closed position. The assembly 51 is rotated to the closed position by the retracted rod 89 or spring 61'. Either actuator 61 or handle 92 could be used to apply force to assembly 51 to rotate it toward pawl 86 to move the pawl to clear stop 63. Further force on the assembly begins to move the operating handle 40 about pivot axis 44, causing wedge 52 to move linearly away from its locking position. As wedge 52 moves, extension spring 67 urges the second end of timing lever 58 toward camming pin 68 until camming surface 62 abuts the pin 68.

As the operating handle continues to move to the open position the wedge 52 and pin 54 move concomitantly, carrying the first end of lever 58 outwardly and pivot the lever on camming pin 68 causing jaw 46 to begin disengaging the kingpin 18, until side 21' of the operating handle engages follower pin 64 to carry the lever wedge and jaw to the fully open position. It will be understood that the bumper assembly 48 moves and operates in the conventional manner.

In the illustrated embodiments, the actuator 28 is an electrically controlled solenoid. The electrically controlled solenoid can be coupled to one or more of many of the components of the fifth wheel mechanism 32 to selectively lock the fifth wheel. It should be readily apparent that the actuator 28 could be coupled to a component of a different type of fifth wheel than the illustrated fifth wheel to selectively lock its jaws.

FIGS. 2–5 illustrate one configuration for locking the fifth wheel jaws 12 around a king pin 18. In the embodiment illustrated by FIGS. 2–5, the actuator 28 is an electrically or electro-pneumatically controlled and powered solenoid 100. The solenoid 100 is connected to the base member 30. The solenoid 100 includes an extendable lock pin 102. The lock pin 102 extends to prevent the fifth wheel jaws 12 from being disengaged from the king pin 18 when the receiving unit 26 provides a lock signal to the solenoid 100.

Figure 3:
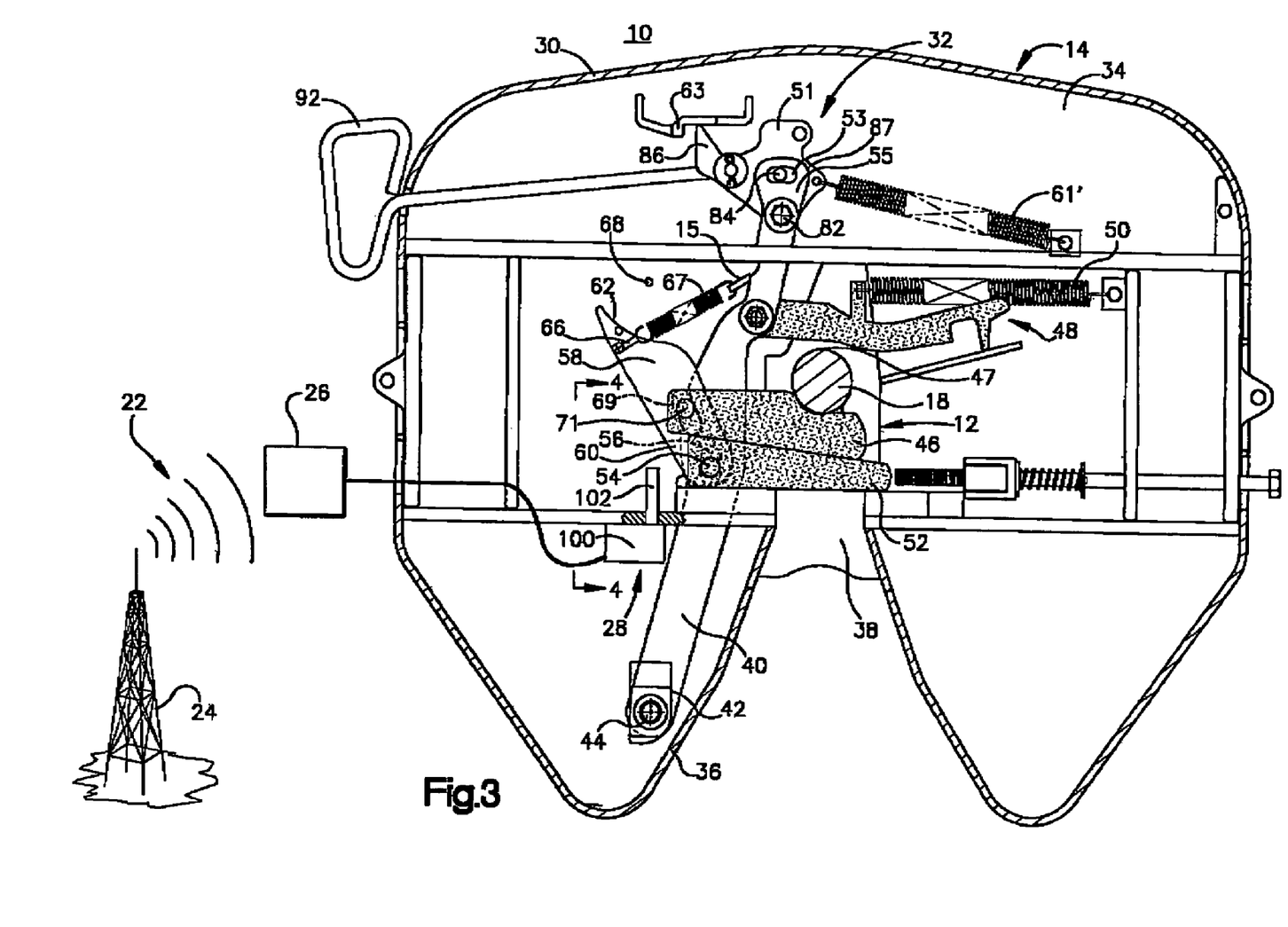
FIG. 3 is a schematic representation of a remote controlled fifth wheel locking system.
Figure 4:
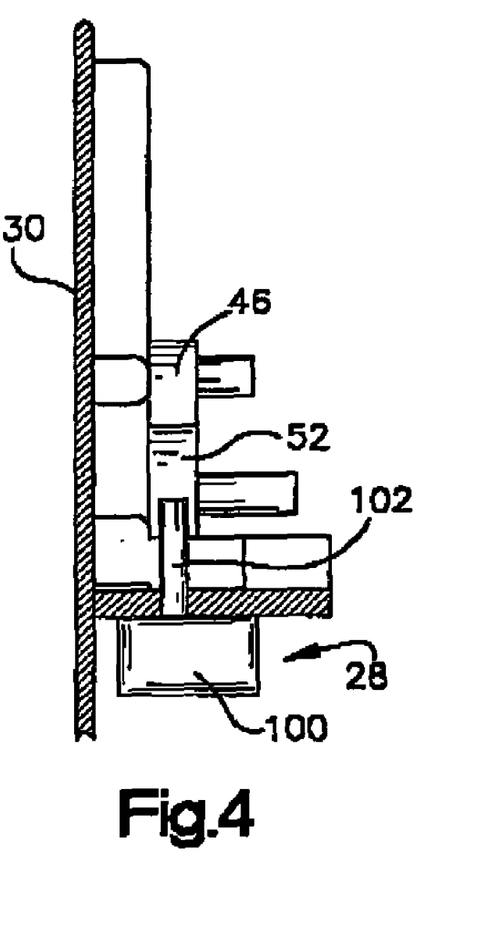
FIG. 4 is a view taken along lines 4—4 of FIG. 3.

FIGS. 3 and 4 show the lock pin 102 in an extended or lock position. In the extended position the lock pin 102 is in the path of the wedge member 52. If an operator attempts to disengage the fifth wheel jaws by pulling the handle 92 when the lock pin is in the extended position, the wedge member will engage the lock pin 102. Engagement of the wedge 52 by the lock pin 102 prevents the jaw member 46 from opening around the king pin 18.

Figure 5:
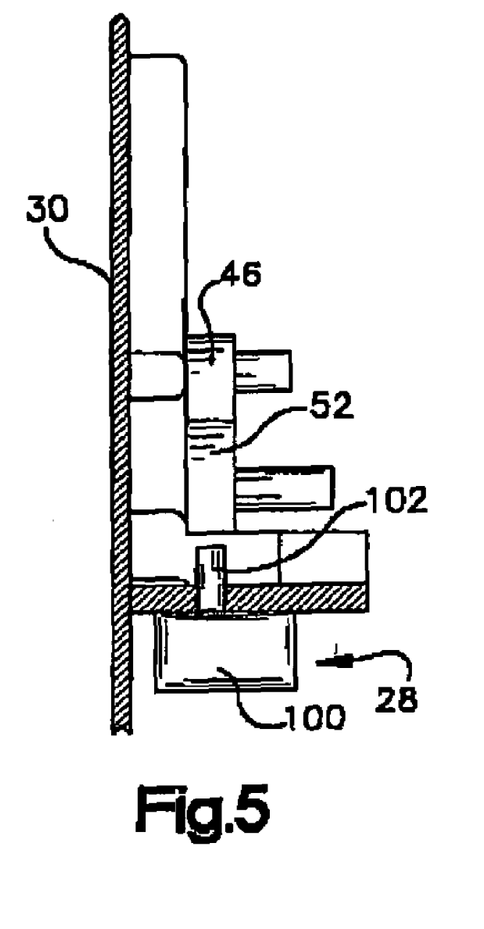
FIG. 5 is a view similar to FIG. 4 with a locking pin in a retracted position.

FIGS. 2 and 5 show the lock pin 102 in an unextended or unlocked position. In the unextended position the lock pin 102 is not in the path of the wedge member 52. If an operator pulls the handle 92 when the lock pin is in the unextended position, the wedge member will clear the lock pin 102 and the jaw member 46 will open around the king pin 18.

Figure 7:
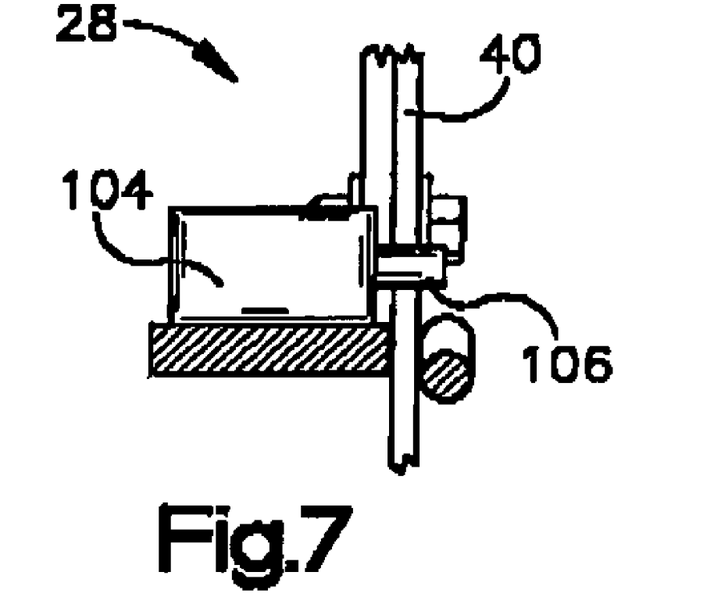
FIG. 7 is a view taken along lines 7—7 of FIG. 6.
Figure 8:
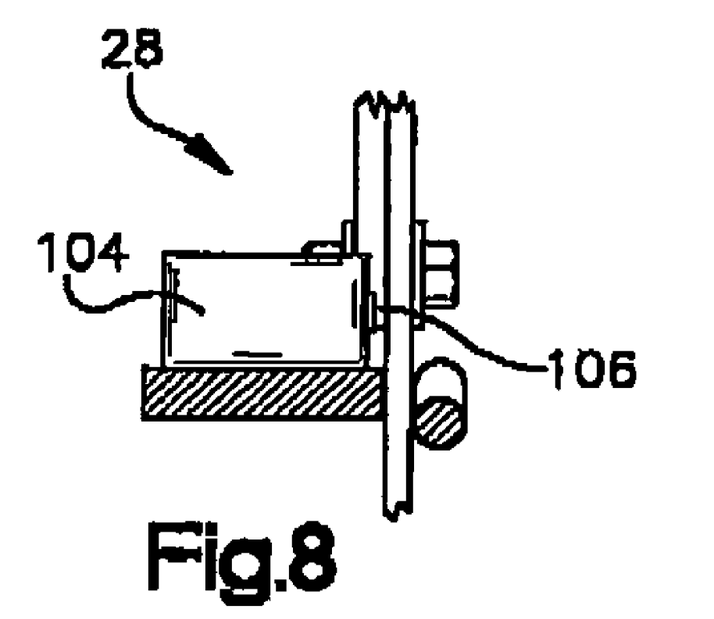
FIG. 8 is a view similar to FIG. 7 with a locking pin in a retracted position.

FIGS. 6–8 illustrate a second configuration for locking the fifth wheel jaws 12 around a king pin 18. In the embodiment illustrated by FIGS. 6–8, the actuator 28 is an electrically or electro-pneumatically controlled and powered solenoid 104. The solenoid 104 is connected to the base member 30. The solenoid 104 includes an extendable lock pin 106. The lock pin extends to prevent the operating handle 40 from being pulled to prevent the fifth wheel jaws from being disengaged from the king pin 18 when the receiving unit 26 provides a lock signal to the solenoid.

FIG. 7 shows the lock pin 106 in an extended or lock position. In the extended position the lock pin 106 is in the path of the operating handle 40. If an operator attempts to disengage the fifth wheel jaws by pulling the handle 92 when the lock pin is in the extended position, the operating handle 40 will engage the lock pin 106. Engagement of the lock pin 106 by the operating handle 40 prevents the jaw member 46 from opening around the king pin 18.

FIG. 8 shows the lock pin 106 in an unextended or unlocked position. In the unextended position the lock pin 106 is not in the path of the operating handle 40. If an operator pulls the handle 92 when the lock pin is in the unextended position, the operating handle 40 will clear the lock pin 106 and the jaw member 46 will open around the king pin 18.

FIG. 9 illustrates a third configuration for locking the fifth wheel jaws 12 around a king pin 18. In the embodiment illustrated by FIG. 9, the fifth wheel mechanism 32 includes a linear actuator 61 that moves or assists movement of the operating handle 40. An electrically or electro-pneumatically controlled and powered air solenoid 108 is connected to the base member 30 and the linear actuator. The solenoid 108 prevents the linear actuator from operating to disengage the fifth wheel lever, thereby preventing the fifth wheel jaws from being disengaged from the king pin when the receiving unit provides a lock signal to the solenoid.

In the embodiment illustrated by FIG. 9, a supply 110 of air under pressure is connected to an inlet 112 of the air solenoid 108. First and second outlets 114,116 of the air solenoid 108 are connected to first and second inlets 118, 120 to the linear actuator 61. The inlets 118, 120 are located on opposite side of a piston 122 of the actuator 61. When a lock signal is provided by the receiving unit 26 to the solenoid 108, the solenoid directs air under pressure to the inlet 118. The air under pressure acts against the piston to prevent the operating handle 4a from being pulled to disengage the jaws 12. When an unlock signal is provided by the receiving unit to the solenoid, the solenoid directs air under pressure to the inlet 120 on the opposite side of the piston (assisting movement of actuator 61 or shuts off the flow of air from the supply 110 to the linear actuator. The handle can be pulled to disengage the jaws 12 when the air solenoid is in this state.

Figure 10:
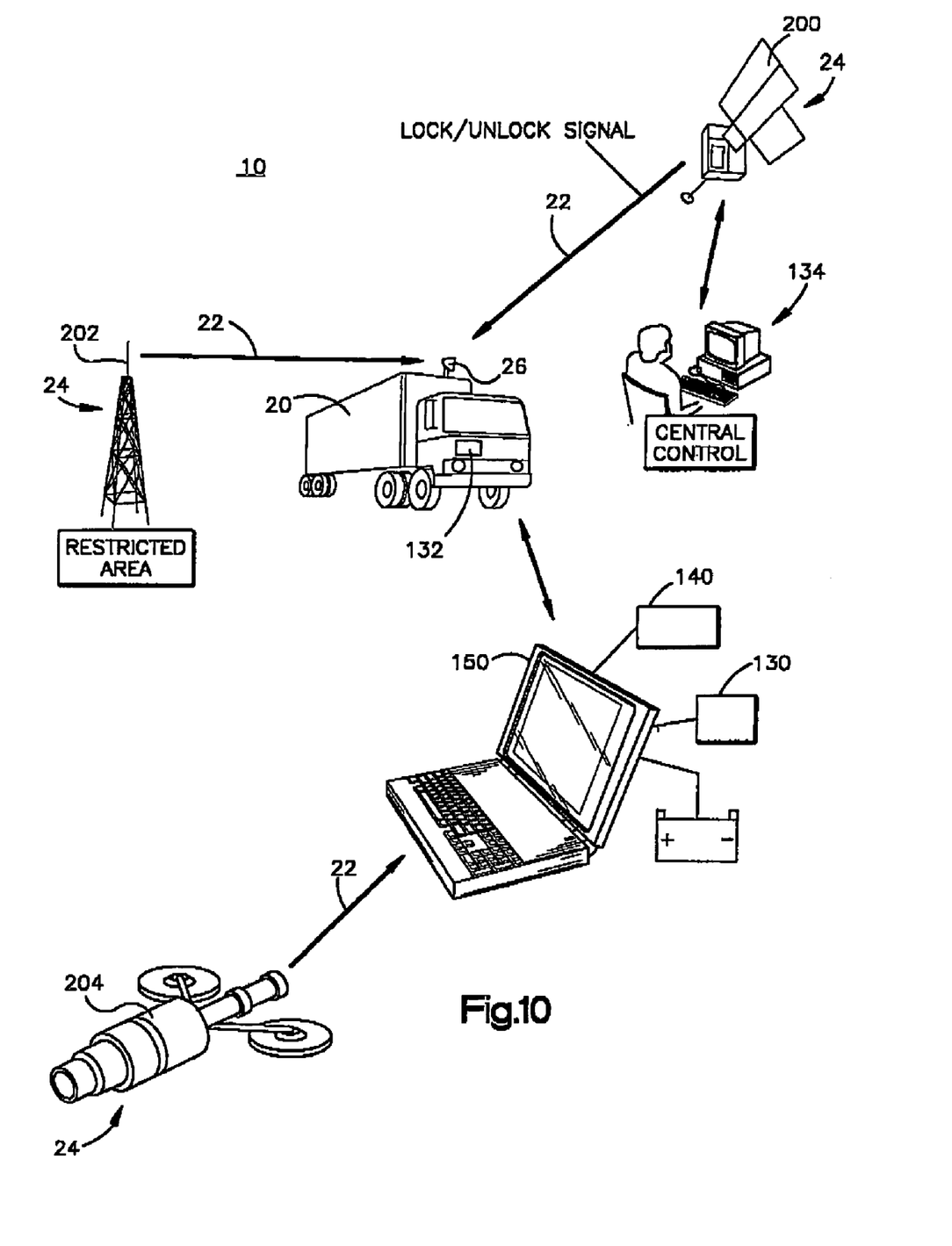
FIG. 10 is a schematic representation of communication between a receiving unit on a tractor and remote transmitters.

In the exemplary embodiment, the actuator 28 is controlled by a signal that is sent by electric means. A wide variety of communications systems may be used the transmitter 24 and receiving unit 26 for the locking system. For example, a PC originated signal may be sent via the internet to terrestrial or satellite based transmitters and on to the truck. In the exemplary embodiment, an onboard computer 150 is linked to the receiving unit 26. FIG. 10 illustrates some of the different types of transmitters 24 that may be used in the locking system 10. FIG. 10 illustrates that the control signal may come from a satellite 200, a terrestrial tower 202, or a global positioning satellite 204. A variety of other types of transmitters could also be used. The signal 24 may be processed directly by the receiving unit 26 or may be processed by an onboard computer.

In one embodiment, the control signal is sent to the truck by a low earth orbit satellite system. One acceptable low earth orbit satellite system is a Volvo Link system available from Volvo Trucks North America. In one embodiment, a high earth orbit satellite transmitter. One acceptable high earth orbit satellite system is provided by Qualcomm. In one embodiment, a short range digital communications system is used to provide the control signal to the tractor. In one embodiment, the transmitter and the receiver comprise mobile telephones.

In one embodiment, the system 10 includes a global positioning system 130. The global positioning system 130 is mounted on the truck (shown in communication with computer 15 in FIG. 10) and is in communication with the receiving unit and/or the onboard computer. A transmitter 132 may be included on the tractor 16. When the tractor includes a transmitter 132, the position of the tractor may be sent to a central control 134. The global positioning system 130 can be used to determine the position of the tractor. If the position of the tractor 16 is unacceptable, the central control, the trucking company and/or governmental authority can send a signal to the receiving unit 26 that locks the fifth wheel 14. In an alternate embodiment, unacceptable locations are stored in the onboard computer 150. The computer causes the fifth wheel lock to be applied when the GPS signal indicates that the tractor is in an unacceptable location.

In one embodiment, such as when the short range digital communications system is used, transmitters may be placed at or near acceptable decoupling areas. The actuator 28 locks the fifth wheel when it is outside the range a transmitter 24 of an acceptable decoupling area. When the tractor enters the range of the transmitter the receiving unit receives the control signal 22 and unlocks the fifth wheel. In this manner, the trailer can only be disengaged from the tractor near acceptable decoupling areas. In one embodiment, transmitters may be placed at or near restricted areas. In this embodiment, the actuator 28 locks the fifth wheel when the tractor is inside the range of the transmitter.

In one embodiment, the system includes an electronic "heartbeat" monitor 140. The monitor 140 continuously detects pulses or signals from the locking system 10 that indicate that the system has not been tampered with. Tampering with the locking system, for example by cutting one of the wires of the system 10, will alter or eliminate the pulse from the locking system. The monitor 140 detects the change in the pulse and causes the actuator 28 to lock the fifth wheel when tampering has occurred.

In one embodiment, the locking system 10 locks the fifth wheel then the tractor 16 deviates from a planned route. The global positioning system 130 is used to track the location of the tractor 16 and provides the location of the tractor to the onboard computer 150. The onboard computer determines whether the vehicle has deviated from the authorized route in excess of a predetermined limit. If the onboard computer determines that the vehicle has not deviated from the authorized route, a predetermined amount of time is allowed to elapse and the check is performed again. If the vehicle onboard computer 150 determines that the vehicle has deviated from the authorized route in excess of company limits the fifth wheel is locked by the locking system 10.

In one embodiment, the onboard computer 150 checks to determine whether the vehicle has entered a restricted perimeter or is approaching a restricted perimeter. The vehicle onboard computer may determine that the tractor is in a restricted perimeter when the distance between the vehicle global positioning system location and the restricted perimeter global positioning system location is less than a predetermined distance. In another embodiment, a transmitter is located in the restricted area that provides a signal to the receiving unit 26 when the tractor is within range of the transmitter. The receiving unit then causes the actuator to lock the fifth wheel 14.

In the exemplary embodiment, authorized vehicle routes and restricted areas are defined by a central control 134 similar to an aircraft flight plan and given a route code number for entry into the onboard computer 150. The driver may deviate from the authorized route within a defined tolerance radius established by central control. The onboard computer 150 compares the vehicle's global positioning system location to the authorized route to determine compliance. The fifth wheel is locked if the driver deviates from the authorized route in the exemplary embodiment.

Restricted areas are considered to be sensitive. Examples of possible restricted sites are as follows:
1. Nuclear facilities
2. Military posts and/or National Guard Armories
3. Water supplies
4. Oil refineries
5. Suspension bridges
6. Tunnels The disclosed locking system is used to lock jaws of a fifth wheel of a truck around a king pin of a trailer in response to a control signal from a remote location. Examples of control signals are global positioning system signals, satellite signals, signals sent via terrestrial towers, radio signals and cellular signals. A state of the control signal is monitored at the truck. The actuator 28 is moved to a first position to allow the fifth wheel jaws to be disengaged from the king pin when the control signal indicates that it is acceptable for the trailer to be uncoupled. The actuator 28 is moved to a second position that prevents the fifth wheel jaws from being disengaged from the king pin when the control signal indicates that the trailer should not be uncoupled from the tractor.

Although the present invention has been described with a degree of particularity, it is the intent that the invention include all modifications and alterations falling within the spirit and scope of the following claims.

I claim:

1. A remote controlled locking system for locking a king pin of a trailer in the jaws of a fifth wheel of a truck, comprising:
   a) a transmitter remotely located from said truck and said trailer surroundings and not controllable by an operator of said truck that transmits a control signal;
   b) a receiving unit on said truck that monitors a state of said control signal; and
   c) an actuator coupled to the fifth wheel jaws and coupled to said receiving unit, said actuator prevents the fifth wheel jaws from being disengaged from said king pin when said receiving unit provides a lock signal to the actuator in response to said state of said control signal, said actuator allows the fifth wheel jaws to be disengaged from said king pin when said receiving unit provides an unlock signal to the actuator in response to said state of control signal.

2. The system of claim 1, wherein said actuator is a solenoid with an extendable lock pin, said lock pin extends to prevent the fifth wheel jaws from being disengaged from said king pin when said receiving unit provides a lock signal to the solenoid.

3. The system of claim 2, wherein said lock pin limits movement of a wedge member to prevent the jaws from being disengaged.

4. The system of claim 1, wherein said actuator is a solenoid with an extendable lock pin, said lock pin extends to prevent a fifth wheel hand lever from being pulled to prevent the fifth wheel jaws from being disengaged from said king pin when said receiving unit provides a lock signal to the solenoid.

5. The system of claim 1, wherein said actuator is a solenoid with an extendable lock pin, said lock pin extends to limit movement of an operating handle to prevent the fifth wheel jaws from being disengaged from said king pin when said receiving unit provides a lock signal to the solenoid.

6. The system of claim 1, further comprising a linear actuator coupled to said jaws, wherein said actuator is an air solenoid coupled to said linear actuator that prevents said linear actuator from operating to disengage a fifth wheel lever, thereby preventing the fifth wheel jaws from being disengaged from said king pin when said receiving unit provides a lock signal to the solenoid.

7. The system of claim 1 wherein said actuator is an electrically controlled solenoid.

8. The system of claim 1 wherein said transmitter is a low earth orbit satellite transmitter.

9. The system of claim 1 wherein said transmitter is a high earth orbit satellite transmitter.

10. The system of claim 1 wherein said transmitter and said receiving unit comprise a short range digital communications system.

11. The system of claim 1 wherein said transmitter and said receiving unit comprise mobile telephones.

12. A method of locking jaws of a fifth wheel of a truck around a king pin of a trailer, comprising:
   a) transmitting a control signal remotely located from said truck and said trailer surroundings and not controllable by an operator of said truck;
   b) monitoring a state of said control signal at said truck;
   c) coupling an actuator to the fifth wheel jaws;
   d) moving the actuator to a first position to allow the fifth wheel jaws to be disengaged from said king pin when said control signal is in a first state; and
   e) moving the actuator to a second position to prevent the fifth wheel jaws from being disengaged from said king pin when said control signal is in a second state.

13. The method of claim 12 wherein said actuator is a solenoid with an extendible lock pin, said lock pin extends to prevent the fifth wheel jaws from being disengaged from said king pin when said signal is in said second state.

14. The method of claim 12 wherein said actuator is a solenoid with an extendible lock pin, said lock pin extends to prevent a fifth wheel hand lever from being pulled to prevent the fifth wheel jaws from being disengaged from said king pin when said signal is in said second state.

15. The method of claim 12 wherein said actuator is an air solenoid that prevents a pneumatic line from disengaging a fifth wheel lever to prevent the fifth wheel jaws from being disengaged from said king pin when said signal is in said second state.

16. The method of claim 12 wherein said signal is transmitted by a low earth orbit satellite transmitter.

17. The method of claim 12 wherein said signal is transmitted by a high earth orbit satellite transmitter.

18. The method of claim 12 wherein said signal is transmitted by a short range digital communications system.

19. The method of claim 12 wherein said signal is transmitted by mobile telephones.

20. The method of claim 12 further comprising determining whether said truck is in an unacceptable area and moving the actuator to prevent the fifth wheel jaws from being disengaged from said king pin when it is determined that said truck is in an unacceptable area.

21. The method of claim 12 further comprising moving the actuator to prevent the fifth wheel jaws from being disengaged from said king pin when said truck is outside a pre-defined range of said transmitter and moving the actuator to allow the fifth wheel jaws to be disengaged from said king pin when said truck is inside said pre-defined range.

22. A method of locking jaws of a fifth wheel of a truck around a king pin of a trailer, comprising:
   a) transmitting a control signal from a remote location;
   b) monitoring a state of said control signal at said truck;
   c) coupling an actuator to the fifth wheel jaws;
   d) moving the actuator to a first position to allow the fifth wheel jaws to be disengaged from said king pin when said control signal is in a first state;
   e) moving the actuator to a second position to prevent the fifth wheel jaws from being disengaged from said king pin when said control signal is in a second state; and,
   f) moving the actuator to prevent the fifth wheel jaws from being disengaged from said king pin if a circuit that controls said actuator is tampered with.

23. A method of preventing a trailer from being uncoupled from a tractor in an unauthorized area, comprising:
   a) defining a planned trailer uncoupling area;
   b) monitoring a location of the tractor; and
   c) sending a signal from a remote transmitter to the trailer locking jaws of a fifth wheel of the tractor around a king pin of the trailer when the tractor is outside the planned uncoupling area.

* * * * *